(No Model.) 2 Sheets—Sheet 1.
J. P. BERGER.
EGG CRATE.
No. 469,114. Patented Feb. 16, 1892.
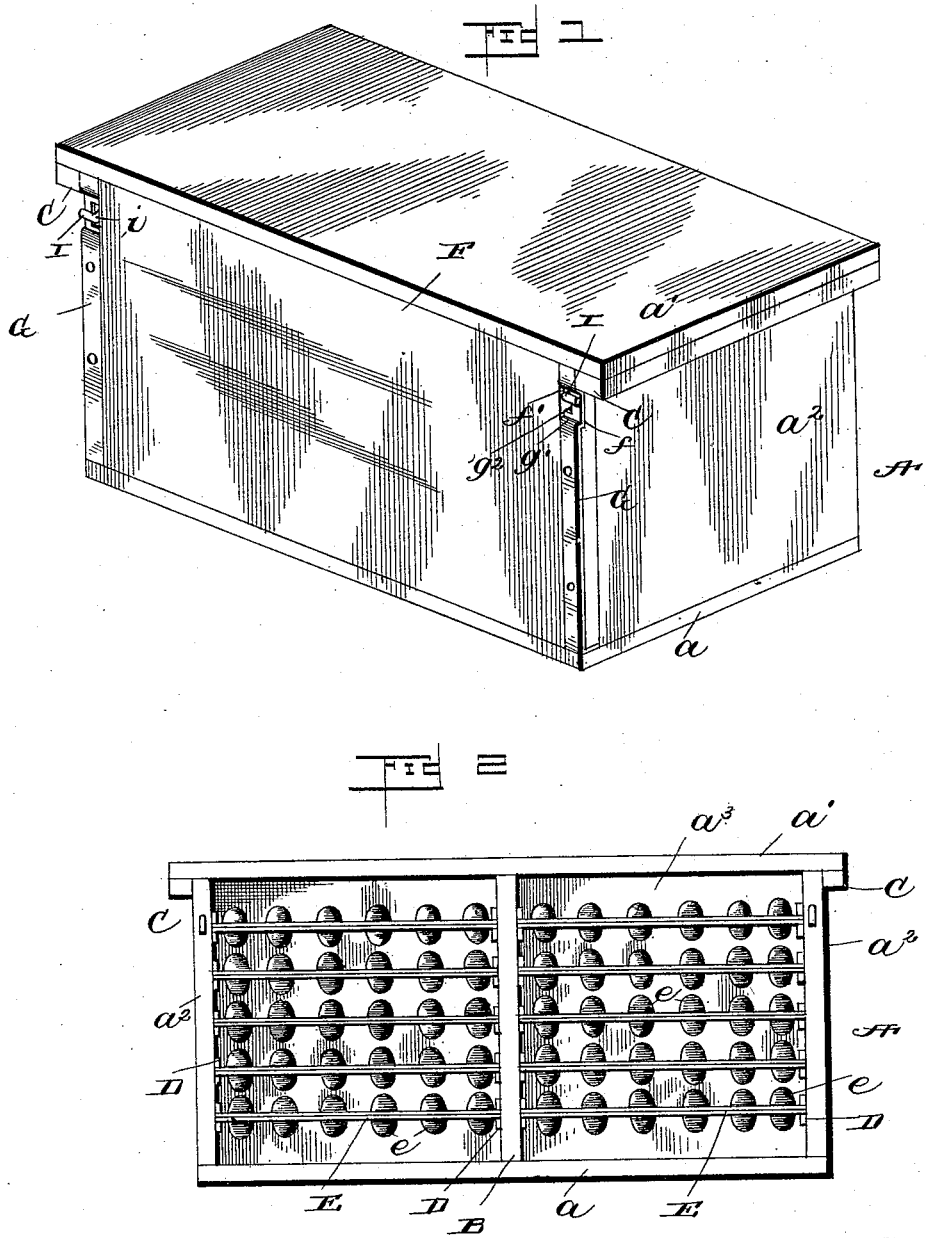
Witnesses
Inventor
John P. Berger,
By his Attorney, (No Model.) 2 Sheets—Sheet 2.
J. P. BERGER.
EGG CRATE.
No. 469,114. Patented Feb. 16, 1892.
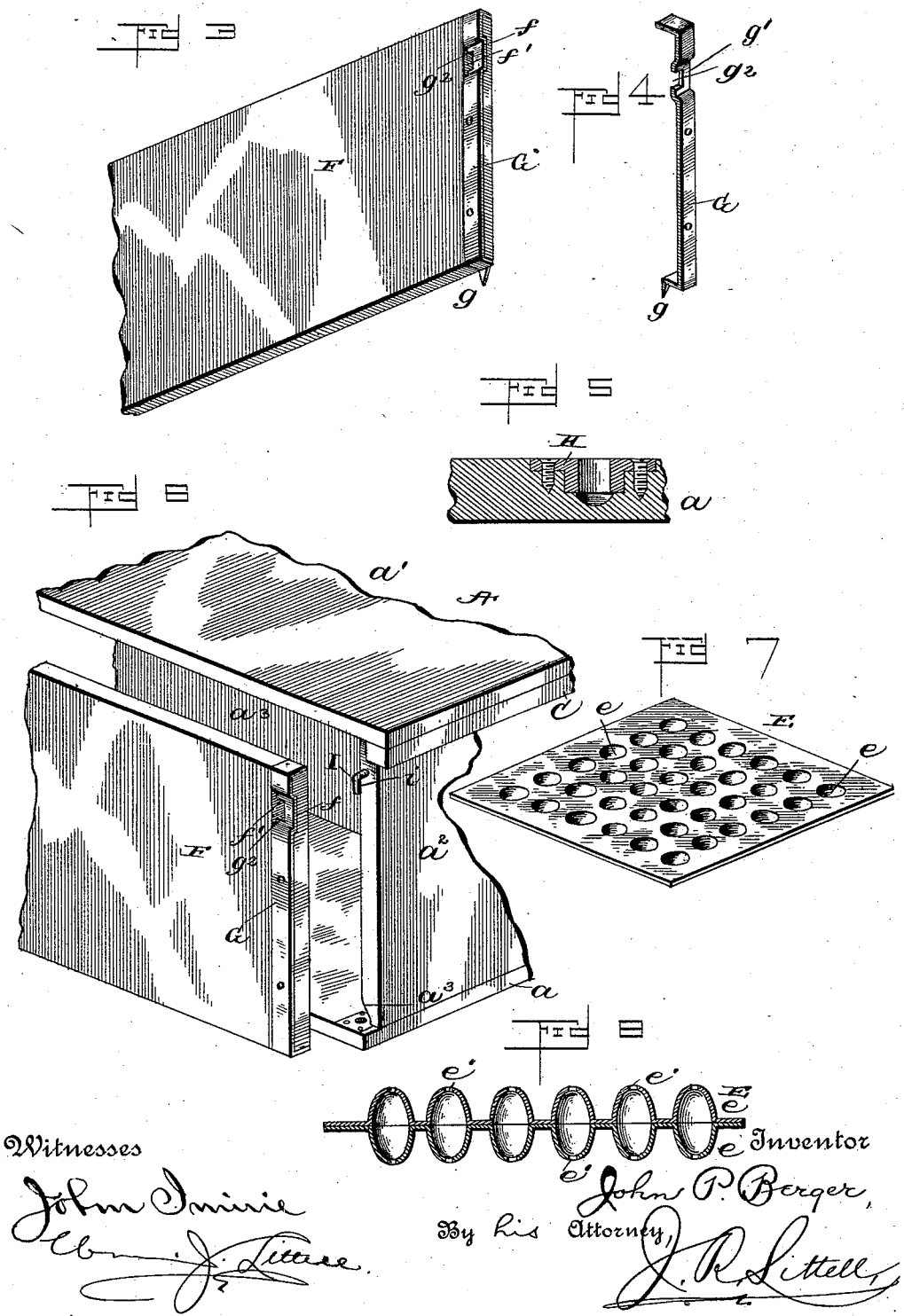

UNITED STATES PATENT OFFICE.

JOHN P. BERGER, OF BEREA, NEBRASKA.

EGG-CRATE.

SPECIFICATION forming part of Letters Patent No. 469,114, dated February 16, 1892.

Application filed July 13, 1891. Serial No. 399,325. (No model.)

*To all whom it may concern:*

Be it known that I, JOHN P. BERGER, a citizen of the United States, residing at Berea, in the county of Box Butte and State of Nebraska, have invented certain new and useful Improvements in Egg-Crates; and I do hereby declare that the following is a full, clear, and exact description of the invention, which will enable others skilled in the art to which it appertains to make and use the same.

My invention relates to certain new and useful improvements in crates for the transportation of eggs, and has for its object to provide a crate within which the eggs may be safely transported and from which they may be quickly and safely removed and means whereby the eggs can be inspected to determine whether or not they are in condition for use, all of which will be hereinafter fully described, and afterward fully pointed out in the claims, due reference being had to the accompanying drawings, forming a part of this specification, wherein—

Figure 1 is a perspective view of the crate closed and ready for transportation; Fig. 2, a side elevation, the cover being removed; Fig. 3, a perspective view of one end of the cover, showing the strap; Fig. 4, a detail view of the strap removed from the cover; Fig. 5, a detail view of one of the socket-plates for holding the cover in place; Fig. 6, an enlarged view of a part of the crate and its cover, illustrating the fastening device; Fig. 7, a perspective view of one of the trays, and Fig. 8 a section of two trays placed face to face.

Referring to the drawings, the letter A indicates a box or crate composed of a bottom $a$, top $a'$, ends $a^2$ $a^2$, and rear $a^3$, said box or crate being divided into two compartments by a partition B. The bottom $a$ and top $a'$ slightly project beyond the front edges of the ends $a^2$ and the top $a'$ slightly overlaps said ends and has secured to the under side thereof strips or battens C. To the inner sides of the ends $a^2$ and to the partition B are nailed or otherwise suitably secured cleats D, within which are adapted to slide the trays E. Said trays are constructed of paper-board or similar material and are provided with cup-shaped depressions $e$ $e$ of the proper size for the reception of the eggs. Each cup $e$ is provided with a small perforation $e'$ for the purpose hereinafter described.

F indicates the cover, consisting of a board of the proper size to fit the front of the crate and lie between the projecting edges of the bottom $a$ and top $a'$ and the front ends of the battens C. To each end of the cover F is secured by means of screws or bolts an iron strap G. Said strap at top and bottom is bent at right angles to embrace the top and bottom edge of the cover F, said cover being recessed the thickness of the strap in order that it may lie flush with the edges. The lower end of the strap G terminates in a downwardly-projecting pin $g$, which is adapted to enter a socket in the plate H, secured to the front outer edge of the bottom $a$ of the crate, the lower inner edges of the ends $a^2$ being cut away, as at $a^3$, to permit the pin $g$ to enter the socket $h$. The edge of the cover F is mortised, as at $f$, and provided with a perforation $f'$, and the strap G is bent, as at $g'$, to fit within the mortise $f$, and its inner edge recessed at $g^2$.

I indicates a catch secured in the front edge of the end $a^2$ of the crate, its outer end being bent at a right angle, as at $i$. When the cover is in position upon the crate the catch, I passes through the perforation $f'$ and the recess $g^2$ in the strap G. To place and fasten the cover in position, the pins $g$ are inserted within the sockets $h$ of the plates H, there being two such plates and two straps, as shown, and the cover pushed into place. The catches I are turned, as shown in Fig. 1, the portion $i$ resting within the bent portion $g'$ of the strap by means of which liability of its accidental displacement is obviated. The cover cannot be removed until the catches I are turned, said cover being held on all sides by the projecting top $a'$, bottom $a$, and the ends of the battens C.

In preparing the crate for transportation the eggs are placed in the cup-shaped depressions of one of the trays E and a second tray inverted and placed over the same, as shown, the cup-shaped depressions registering one with another. The trays when thus filled are slipped between the cleats D, one above another. Any one of said trays can be removed without disturbing the others, and by holding the trays up to the light the eggs can be inspected through the perforations in the bottoms of the cup-shaped depressions to determine their condition.

Having described my invention, what I claim is—

1. The herein-described egg-crate, open at one side and provided with perforated cup-shaped trays disposed in pairs, a projecting top and bottom, a removable cover mortised at each end and having apertures in said mortises, metallic straps secured to each end of the cover, bent to fit within the mortises, and provided with recesses coinciding with the apertures, said straps terminating at their lower ends in pins, socket-plates secured to the bottom of the crate and adapted to receive said pins, and headed pins secured to the front of the crate and adapted to be received by the apertures and recesses at the ends of the cover, substantially as set forth.

2. The combination, in an egg-crate open at one side and having a projecting top and bottom, of a removable cover mortised and perforated at each end, as at $ff'$, metallic straps secured to each end of said cover and bent, as at $g'$, to fit within the said mortises and recessed, as at $g^2$, to register with the perforations $f'$, said straps terminating at their lower ends in pins, socket-plates secured to the bottom of the crate for the reception of the pins, and headed pins secured to the front of the crate and passing through the perforations $f'$ and recesses $g^2$ and turning therein, substantially as shown and described.

In testimony whereof I affix my signature in presence of two witnesses.

JOHN P. BERGER.

Witnesses:
H. F. FILLMORE,
ASA W. SHERWOOD.